Patented Feb. 20, 1940

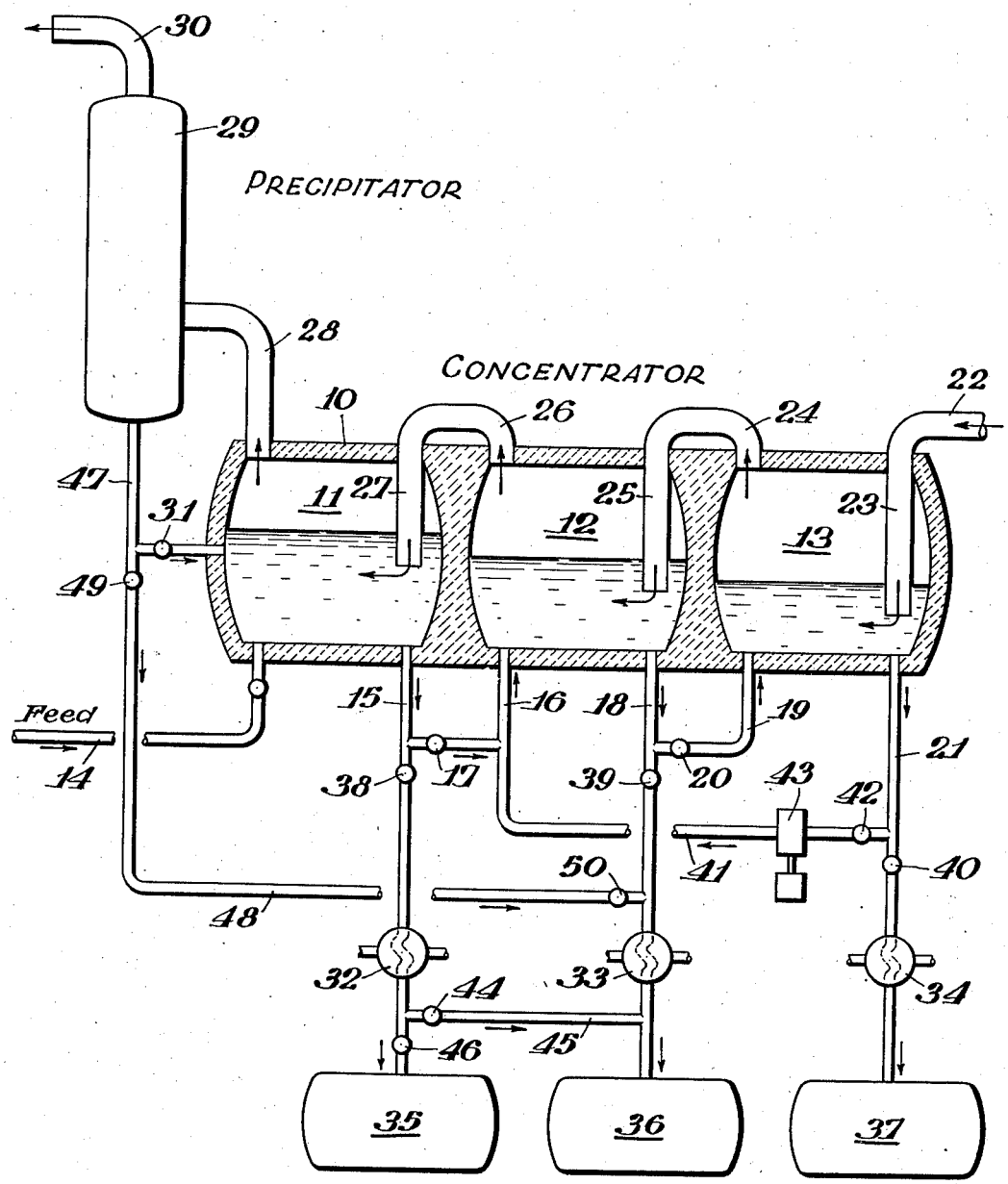

2,191,195

UNITED STATES PATENT OFFICE 2,191,195

PROCESS OF CONCENTRATING SULPHURIC ACID

Arthur B. Brown, Hammond, Ind., and David W. Bransky, Chicago, Ill., assignors to Standard Oil Company, Chicago, Ill., a corporation of Indiana Application July 8, 1938, Serial No. 218,100

7 Claims. (Cl. 23—171)

This invention relates to the concentration of sulphuric acid and more particularly to the concentration of sulphuric acid which has been partially spent or diluted in the carrying out of organic reactions, such as the treating of petroleum or other hydrocarbon oils or waxes.

The concentration of such acids by the usual methods presents many problems because they contain organic impurities such as carbonaceous materials in solution and/or suspension which tend to form coke deposits within the concentration equipment and to foam badly at certain concentrations. Generally speaking restored or partially restored acids tend to foam in the range of about 65-70% to about 75-85%, depending upon the amount and kind of organic material present.

It is thought that this foaming phenomenon is due to the subjection of the acid to a temperature at which reduction of the acid by the organic matter present accelerates itself, the stability of the foam probably being increased by the separating tarry material. Regardless of the cause of foaming, it is particularly detrimental in the operation of multi-stage concentrators of the type in which hot flue gas is bubbled through rather large bodies of acid. If foaming occurs in the first or weak acid stage, it results in the carry-over of considerable material which quickly fouls the Cottrell precipitators almost invariably used in the flue gas outlet. Foaming in the last stage often causes the acid therefrom to overflow in the receiving tank or cooler, and in any stage it causes excessive agitation of the liquid acid in such a way as to increase downcomer pipe breakage.

An object of our invention is to provide a process of concentrating spent sulphuric acid whereby foaming is eliminated without loss of capacity. Another object is to provide a method of operating a multi-stage acid-concentrating unit so that all stages are maintained at a non-foaming concentration. Still another object is to provide a method of producing an acid having a concentration in the foaming range while avoiding foaming within the concentrating equipment. Further objects and advantages will be apparent from the following detailed description read in conjunction with the drawing, which shows diagrammatically one form of apparatus suitable for practicing our invention.

We have found that the concentration of sulphuric acid containing organic impurities and tending to foam within a certain range of concentration can be carried out successfully without foaming difficulties in a multi-stage process by maintaining the acid strength in at least one of these stages below the foaming range, and the acid strength in the next stage above the foaming range. While this range is generally between about 65-70% and 75-85% as stated above, each type of spent acid has its own characteristic range, which must be determined by experiment. For example a particular sludge acid which had been used in the treating of petroleum oils was found to foam during concentration when its strength was in the range from about 68% to about 78%.

Our invention is particularly applicable to processes of concentrating sulphuric acid in which the acid is passed successively through a number of bodies of acid of increasing concentration and hot flue gas successively bubbled through each of these bodies of acids in the order of decreasing acid strength, and will be described in connection therewith, although it can be used in connection with other types of concentrating processes.

Referring now to the drawing, a conventional three-stage acid concentrator 10 is shown containing three chambers 11, 12 and 13 with a body of acid partly filling each chamber. Weak acid to be concentrated is supplied to chamber 11 by suitable means (not shown) through line 14, acid from chamber 11 is introduced into chamber 12 by means of lines 15 and 16 controlled by valve 17, acid from chamber 12 is introduced into chamber 13 through lines 18 and 19 controlled by valve 20, and concentrated acid is withdrawn from chamber 13 by means of line 21. As illustrated the flow of acid through the concentrator is by gravity although circulating pumps may of course be used between stages. A hot inert gas such as flue gas from a furnace (not shown) is supplied to chamber 13 through pipe 22 and downcomer 23 and bubbles through the body of acid therein to the vapor space within the chamber. Similarly the gases from this vapor space are introduced by means of pipe 24 and downcomer 25 into chamber 12 and from chamber 12 by means of pipe 26 and downcomer 27 into chamber 11. The vapors in the vapor space within chamber 11 are vented by means of pipe 28 through an electrical precipitator 29, commonly known as a Cottrell precipitator, and pipe 30 to the atmosphere.

It is apparent that the acid concentrations in chambers 11, 12 and 13 increase in that order and that the most concentrated acid is contacted with the hottest flue gas so that a maximum of acid concentration takes place in the system. The temperature in each stage depends upon the acid strength therein since the various bodies of acid are kept at their respective boiling points by the hot gases, so that the temperatures of acid in chambers 11, 12 and 13 increase in that order. When the process has been operating for some time the acid strength in each stage reaches an equilibrium, the volume of acid entering each stage being sufficiently small with respect to the total volume in the stage that no appreciable dilution occurs, except in the immediate vicinity of the point of introduction.

The purpose of electrical precipitator 29 is to remove entrained acid from the outgoing gas and the acid separated thereby is normally returned to chamber 11 by means of line 47 through valve 31. In order that acids of various concentrations can be obtained from the same system coolers 32, 33 and 34 and receiving tanks 35, 36 and 37, respectively, are provided for the acids in chambers 11, 12 and 13, the quantity of acid withdrawn from each of these chambers being controlled by means of valves 38, 39 and 40, respectively.

In the usual type of operation in which a weak acid of 55% concentration, for example, is to be concentrated to 90-95%, the concentration of the body of acid in chamber 11 will normally be about 65%, that in chamber 13, 90-95%, and that in chamber 12 about 75-80%, which is within the foaming range. As a result breakage of downcomer 25 is likely to be a very serious item of expense and the foam is likely to be carried over into chamber 11 through pipe 26 and downcomer 27 thus increasing the concentration in chamber 11 so that it too may have a tendency to foam into precipitator 29. In order to avoid this difficulty a line 41 controlled by valve 42 is provided which connects lines 21 and 16 and which has a pump 43, which may for example be an air lift, so that strong acid may be recycled from chamber 13 to chamber 12 thus raising the concentration of the acid in chamber 12 to a point above the foaming range for the acid being concentrated. The process is thus operated so that the acid strength in chamber 11 is below the foaming range and in chamber 12 is above the foaming range and a concentrated acid of the desired strength is obtained in receiving tank 37 without foaming difficulties.

Obviously more than three stages of concentration can be used, the additional stages being at the weak acid and/or strong acid end, but in any case the acid in two adjacent concentrating chambers is maintained in the manner described at strengths just below and just above the foaming range.

It may be desirable under some conditions to produce an acid having a concentration which is within the foaming range and it is apparent that this cannot be done by conventional operation inasmuch as the final stage is ordinarily that maintained at the concentration of the desired product and if this concentration is in the foaming range there is great danger that the acid therein may produce foam within the cooler and receiving tank with resultant loss of acid and danger to operating personnel. In order to produce an acid of such concentration according to our invention, we can recycle all or a part of the acid in chamber 13 through line 21, valve 42, pump 43, line 41 and line 16 to chamber 12 as before, withdraw acid from chamber 12, which is above the foaming range, through line 18, valve 39 and cooler 33 into receiving tank 36 and also introduce into tank 36 sufficient weak acid to reduce the concentration therein to the desired value. The weak acid for blending in tank 36 can be all or a part of the precipitated acid from precipitator 29 supplied through lines 47 and 48 and valves 49 and 50, or a portion of the acid from chamber 11 supplied through line 15, valve 38, cooler 32, valve 44 and line 45, valve 46 leading to tank 35 being closed. By this method of operation we are able to produce either an acid within the foaming range alone or an acid of this concentration as well as a stronger acid without any foaming difficulties.

In producing an acid having a concentration within the foaming range, by the method hereinabove described, it is not esential that three or more stages be used but two stages may be sufficient as long as the concentrated acid stage is maintained above the foaming range, and the other steps enumerated are carried out.

While we have described our invention in connection with certain specific embodiments thereof, we do not desire to be limited thereto but only by the following claims, which should be construed as broadly as the prior art will permit.

We claim:

1. In the concentration of sulphuric acid containing organic impurities by direct contact with hot gases in at least three stages, the method which comprises maintaining the acid in at least one of said stages at a relatively low concentration below the foaming range, passing a stream of said acid of relatively low concentration to the next stage, and recycling a stream of acid of relatively high concentration from a subseqnent stage to the last-mentioned stage in such amount that the concentration of the acid in said last-mentioned stage is maintained above the foaming range.

2. In the concentration of sulphuric acid containing organic impurities and having a tendency to foam at concentrations in the range from about 65-70% to about 75-85% in at least three stages by direct contact with hot gases passing through said stages in the order of decreasing acid strength, the combination which comprises maintaining the acid in at least one of said stages at a concentration below said foaming range, passing a stream of said acid from said stage to the next stage, recycling a stream of relatively concentrated acid from a subsequent stage to the last-mentioned stage in such amount that the concentration of the acid in said last-mentioned stage is maintained above said foaming range, and withdrawing concentrated acid from the last of said stages.

3. The method of concentrating sulphuric acid containing organic impurities and having a tendency to foam at concentrations from about 65-70% to about 75-85% in three stages by direct contact with hot gases passing through said stages in the order of decreasing acid strength which comprises maintaining a body of acid in each of said stages, introducing a stream of weak acid into the first of said stages, maintaining the concentration of acid in said first stage below the foaming range, introducing acid from said first stage into the second of said stages and from said second stage into the last of said stages, withdrawing a stream of concentrated acid from said last stage, and recycling at least a portion of said concentrated acid to said second stage in such amount that the concentration of the acid in said second stage is maintained above said foaming range.

4. The method of concentrating sulphuric acid according to claim 3 comprising the steps of withdrawing streams of acid from said first and second stages and blending said streams to produce an acid of intermediate concentration.

5. The method of concentrating sulphuric acid according to claim 3 comprising the steps of electrically precipitating the acid entrained in the hot gases from said first stage, withdrawing a stream of acid from said second stage, and blending said last-mentioned stream of acid with said precipitated acid to produce an acid of intermediate concentration.

6. The method of concentrating sulphuric acid containing organic impurities and having a tendency to foam at concentrations in the range from about 65–70% to about 75–85% in a plurality of stages by direct contact with hot gases passing through said stages in the order of decreasing acid strength to produce an acid having a concentration within said foaming range which comprises maintaining the acid in one of said stages at a concentration below said foaming range, introducing acid from said stage into the next of said stages, maintaining the acid in the last-mentioned stage at a concentration above said foaming range, withdrawing a stream of acid from said last-mentioned stage, withdrawing a stream of acid from said first-mentioned stage, and blending said streams of acid.

7. The method of concentrating sulphuric acid containing organic impurities and having a tendency to foam at concentrations in the range from about 65–70% to about 75–85% in a plurality of stages by direct contact with hot gases passing through said stages in the order of decreasing acid strength to produce an acid having a concentration within said foaming range which comprises maintaining the acid in one of said stages at a concentration below said foaming range, introducing acid from said stage into the next of said stages, maintaining the acid in the last-mentioned stage at a concentration above said foaming range, withdrawing a stream of acid from said last-mentioned stage, subjecting the hot gases containing entrained acid from said first-mentioned stage to electrical precipitation to form a stream of acid, and blending said streams of acid.

ARTHUR B. BROWN.
DAVID W. BRANSKY.